(No Model.)
ALVIN FRANKLIN & ALBERT FRANKLIN.
NUT AND BOLT LOCK.
No. 526,697.  Patented Oct. 2, 1894.
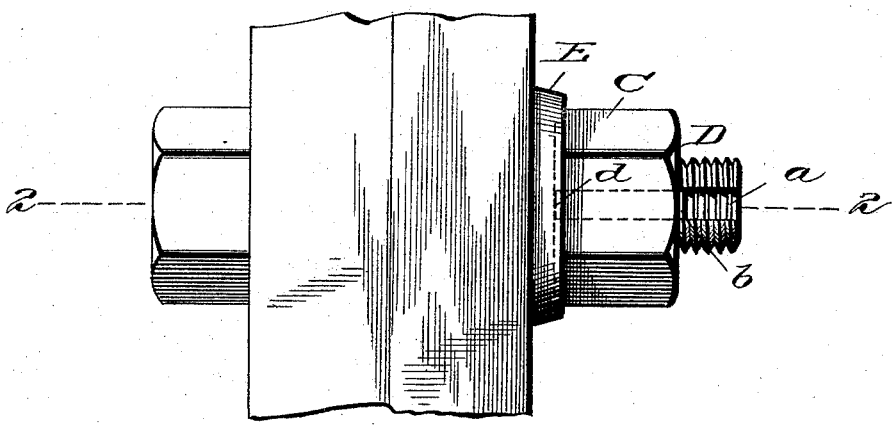
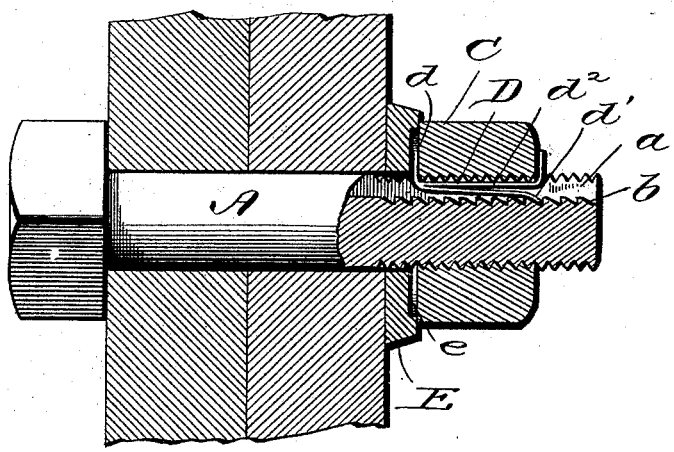
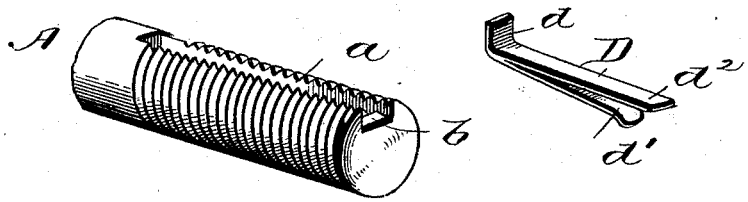
Witnesses
Inventors
Alvin Franklin,
Albert Franklin.
By Attorneys

UNITED STATES PATENT OFFICE.

ALVIN FRANKLIN AND ALBERT FRANKLIN, OF WESTERVILLE, OHIO.

NUT AND BOLT LOCK.

SPECIFICATION forming part of Letters Patent No. 526,697, dated October 2, 1894.

Application filed January 27, 1894. Serial No. 498,224. (No model.)

*To all whom it may concern:*

Be it known that we, ALVIN FRANKLIN and ALBERT FRANKLIN, citizens of the United States, residing at Westerville, in the county of Franklin, State of Ohio, have invented certain new and useful Improvements in Nut and Bolt Locks; and we do hereby declare the following to be a full, clear, and exact description of the invention, such as will enable others skilled in the art to which it appertains to make and use the same.

Our invention relates to nut and bolt locks of that class in which a key is provided as the locking means and located between the body of the bolt and nut.

The improvement consists essentially of a bolt having a longitudinal groove provided with a series of notches in the inner wall and a key having engagement with the nut and moved thereby in the said groove and engaged by one of the notches of a series to prevent retrograde movement of the said key.

The improvement also consists in having the said key composed of spring members whereby it will automatically engage with one of the series of said notches and automatically lock therewith, and having an outer projection to engage with the nut whereby the key is advanced in its groove or seat as the nut is screwed home, and having one of the said spring members constructed to be bent over the outer face of the nut to hold the same in place after being screwed home.

The improvement also consists of the novel features and the peculiar construction and combination of the parts which will be hereinafter more fully described and claimed and which are shown in the annexed drawings, in which—

Figure 1 is a side elevation of a nut and bolt lock embodying the invention. Fig. 2 is a detail section on the line 2 2 of Fig. 1 on a larger scale. Fig. 3 is a detail view of the threaded end of a bolt having a key seat formed therein in accordance with the spirit of our invention. Fig. 4 is a detail view of a key.

The bolt A is provided on its threaded end with a longitudinal groove or key seat $a$ which is deeper than the threads of the said bolt. The inner wall of this groove or key seat is provided with a series of notches $b$ one of which is engaged by the key D and holds the latter from outward displacement. The nut C is of ordinary construction and is internally threaded to screw upon the threaded end of the bolt A.

The key D is provided with an outer projection $d$ which is engaged by the nut C by means of which the said key is moved in its groove or seat $a$ as the said nut is screwed home. This projection $d$ is preferably formed by bending outward the inner end of the said key. This key comprises portions $d'$ $d^2$ which are adapted to spring apart to cause the outer bent end of the part $d'$ to automatically engage with the notches $b$ as the key is advanced along in its seat. The free end of the part $d'$ is bent slightly to enter one of the notches and prevent outward movement of the key and is adapted to ride over the projecting portion between the said notches as the nut is turned up. The outer end of the part $d^2$ is adapted to be bent over the outer face of the nut C after the latter has been screwed home to secure the said nut in place and prevent its accidental displacement as will be readily understood. A washer E is interposed between the nut and the object to be bolted and is provided with a recess or depression $e$ to receive the projection or bent end $d$ of the key.

In the application of the invention the key D is placed in the seat $a$ and the nut C is screwed on the bolt in the usual manner. The projecting portion $d$ of the key engaging with the inner face of the nut causes a longitudinal movement of the said key in its seat as the nut is screwed home. The end of the portion $d'$ will engage with one of the notches $b$ as the key is advanced along the seat and prevent outward displacement of the said key. After the nut has been screwed home the end of the part $d^2$ is bent over the outer face of the nut and secures the same from accidental displacement. To remove the nut at any time the bent end of the part $d^2$ is straightened and the nut removed in the usual manner.

Having thus described our invention, what we claim, and desire to secure by Letters Patent, is—

1. In a nut and bolt lock, the combination with a bolt having a longitudinal groove, and provided with notches upon the inner face of said groove, of a nut, and a key located in the groove, said key having positive engagement with the nut at each end whereby said key moves in unison with the nut, said key being provided with a portion to automatically engage the notched face of the groove, substantially as described.

2. In a nut and bolt lock the combination of a bolt having a longitudinal key seat extending across the threaded portion and provided with notches at its inner wall, and a nut, of a key having portions which are adapted to spring apart and be moved inward in the said key seat by positive engagement with the nut, one of the said portions automatically engaging with one of the said notches in the key seat and the other portion adapted to be bent over the outer face of the said nut, substantially as and for the purpose set forth.

3. In a nut lock the combination with a bolt having a longitudinal groove provided with notches in its inner wall, a washer having a recess in its outer face, a nut and a key having one of its ends bent beneath the nut, the opposite end being divided, one member being adapted to engage the notched face of the bolt while the other member is adapted to be bent over upon the outer face of the nut, substantially as shown and described.

In testimony whereof we affix our signatures in presence of two witnesses.

ALVIN FRANKLIN.
ALBERT FRANKLIN.

Witnesses:
J. M. HAYNES,
D. S. SEELEY.